United States Patent
Zhang et al.

(10) Patent No.: US 12,253,785 B2
(45) Date of Patent: Mar. 18, 2025

(54) APPARATUS AND METHOD FOR MEASURING AND CONTROLLING CHIRP OF ULTRAFAST LASER PULSE

(71) Applicants: The Hong Kong University of Science and Technology, Hong Kong (CN); The Regents of the University of California, Oakland, CA (US)

(72) Inventors: Jingdi Zhang, Hong Kong (CN); Xiaoyue Zhou, Hong Kong (CN); Richard Douglas Averitt, San Diego, CA (US)

(73) Assignees: The Hong Kong University of Science and Technology, Hong Kong (CN); The Regents of the University of California

( * ) Notice: Subject to any disclaimer, the term of this patent is extended or adjusted under 35 U.S.C. 154(b) by 134 days.

(21) Appl. No.: 18/177,748

(22) Filed: Mar. 2, 2023

(65) Prior Publication Data

US 2023/0318244 A1 Oct. 5, 2023

Related U.S. Application Data

(60) Provisional application No. 63/326,284, filed on Apr. 1, 2022.

(51) Int. Cl.
*G02F 1/35* (2006.01)
*G01J 11/00* (2006.01)
(Continued)

(52) U.S. Cl.
CPC ............ *G02F 1/3501* (2013.01); *G01J 11/00* (2013.01); *G02F 1/3551* (2013.01); *G02F 1/37* (2013.01);
(Continued)

(58) Field of Classification Search
CPC ........ G02F 1/3501; G02F 1/3551; G02F 1/37; G02F 2203/13; H01S 3/0057; H01S 3/0092; G01J 11/00
See application file for complete search history.

(56) References Cited

U.S. PATENT DOCUMENTS

| | | |
|---|---|---|
| 6,844,552 B2 | 1/2005 | Zhang et al. |
| 8,134,128 B2 | 3/2012 | Zhang et al. |
| (Continued) | | |

FOREIGN PATENT DOCUMENTS

| | | |
|---|---|---|
| CN | 104729723 A | 6/2015 |
| EP | 2654142 A1 | 10/2013 |
| (Continued) | | |

OTHER PUBLICATIONS

English Translation of JP 2008-122278 A, 13 pages (Year: 2008).*
(Continued)

*Primary Examiner* — Daniel Petkovsek
(74) *Attorney, Agent, or Firm* — Idea Intellectual Limited; Margaret A. Burke; Sam T. Yip

(57) ABSTRACT

An aspect of the present disclosure is related to a method for measuring and controlling linear chirp level of ultrafast laser pulse. The method includes steps as follows. A carrier-envelope phase-chirp (CEP-chirp) relation which serve as a chirp monitor is extracted, in which the CEP-chirp relation is generated from an ultrafast laser pulse. A linear chirp level of a target pulse is measured in response to the CEP-chirp relation. According to the measuring with respect to the linear chirp level of the target pulse, a dispersion element which the ultrafast laser pulse passes through is varied to control and stabilize the linear chirp level of the target pulse.

12 Claims, 4 Drawing Sheets
(1 of 4 Drawing Sheet(s) Filed in Color)

(51) Int. Cl.
   *G02F 1/355* (2006.01)
   *G02F 1/37* (2006.01)
   *H01S 3/00* (2006.01)

(52) U.S. Cl.
   CPC ........ *H01S 3/0057* (2013.01); *G02F 2203/13* (2013.01); *H01S 3/0092* (2013.01)

(56) References Cited

U.S. PATENT DOCUMENTS

| | | | |
|---|---|---|---|
| 2005/0230625 A1* | 10/2005 | Zhang | G01N 21/3581 250/341.1 |
| 2009/0257464 A1 | 10/2009 | Dantus et al. | |
| 2021/0165300 A1 | 6/2021 | Cushing et al. | |

FOREIGN PATENT DOCUMENTS

| | | | | |
|---|---|---|---|---|
| JP | 2008122278 A | * | 5/2008 | G01N 21/35 |
| JP | 2013068524 A | * | 4/2013 | G01N 21/35 |

OTHER PUBLICATIONS

Mikhail Mamaikin. Time-Resolved Microscopy of Near-Infrared to Visible Waveforms. Dissertation, LMU München: Faculty of Physics. (2020).

Mehran Bahri. Watt-level Sub-100 Femtosecond Pulses at 2 μm Synchronously Pumped Optical Parametric Oscillator by Kerr-lens Mode-locked Yb:YAG Thin-disk. (2022) 10.13140/RG.2.2.27985.20328.

Matthias Kubel. Single-Cycle Non-Sequential Double Ionization. Dissertation, LMU München: Faculty of Physics. (2014).

Billy Lam et al. Direct determination of complex amplitude of arbitrary ultrashort pulses via spectral phase conjugation. New Journal of Physics 23, (2021) 033047.

Wei Fan et al. Measurement of the chirp characteristics of linearly chirped pulses by a frequency domain interference method. Optics Express, 21(11), (2013) 13062-13067.

Zhen Zhang et al. Optimum chirp for efficient terahertz generation from two-color femtosecond pulses in air. Applied Physics Letters, 113(24), (2018) 241103.

* cited by examiner

APPARATUS AND METHOD FOR MEASURING AND CONTROLLING CHIRP OF ULTRAFAST LASER PULSE

CROSS-REFERENCE TO RELATED APPLICATIONS

The present application claims priority from a U.S. provisional patent application Ser. No. 63/326,284 filed on 1 Apr. 2022, and the disclosures of which are incorporated by reference in their entirety.

FIELD OF THE INVENTION

The present invention relates to ultrafast laser pulse in optical metrology, and more particularly, to measurement and control for linear chirp of ultrafast laser pulse.

BACKGROUND

Ultrafast femtosecond light pulse, generated by a process known as Chirped Pulse Amplification, has been widely applied in research due to its exceedingly high peak power for studying strong-field optical effects and extremely short temporal resolution for investigating fundamental physics in non-equilibrium dynamics. Besides, pulse chirping has its irreplaceable function in manipulating ultrafast pulses, as it tailors the lifetime of a light pulse conveniently.

The word "chirp" is used for describing the characteristic that the instantaneous frequency changes with time: if the instantaneous frequency a of a light pulse increases (or decreases) with time, it is said that the pulse has up chirp (or down chirp). Linear chirp is the simplest as the instantaneous frequency changes linearly with time $\omega(t)=\omega_0+Ct$, where $$C = \frac{z\beta_2}{T_0^2},$$

with $\beta_2$ being group velocity dispersion index, and z being travelling distance in a linear chirp system. A pulse with zero chirp level C=0 then possesses a time-independent constant frequency, which is called transform-limited. The wide application of linear chirp is because pulse duration can be easily changed $T=T_0\sqrt{1+C^2}$, where it's apparent transform-limited pulse has the shortest pulse duration $T_0$. The introduction of linear chirp can be realized by sending the light pulse through dispersive medium or devices, comprising prisms or diffraction gratings, to impose frequency-dependent phase shift and therefore deform the carrier envelope of the optical pulse thereof.

The importance of conversely measuring the chirp is twofold. On the one hand, a real experimental system inevitably involves dispersion of many kinds, resulting in unwanted chirp on the light pulse. For this reason, identification of the adverse chirp in the first place is crucial for subsequent chirp compensation.

On the other hand, the chirped pulse, especially the linearly-chirped, has been widely utilized in ultrafast science including single attosecond pulse generation, coherent control of atomic collisions, far- and mid-IR radiation, etc. Precise determination of the chirp information enabled by exquisite optical devices will provide more accurate probe to investigate and manipulate ultrafast processes at an advanced level.

Although various metrology systems, e.g., correlation measurement either in time (Mogi, Naganuma, & Yamada, 1988) or frequency domain (Fan et al., 2013), have been devised to retrieve the chirp of an ultrafast light pulse, they are only effective for large chirp cases, that is, far beyond transform-limited condition. It is because the precise capture of frequency comes at the expense of temporal resolution to minimize the uncertainty. For instance, the electric field of optical pulse from a high power Ti:sapphire laser (central wavelength 800 nm, 375 THz) completes one cycle, $2\pi$ change in phase, of oscillation in just 2.6 femtosecond. To date, metrology, providing high precision measurement on the chirp of a near-transform-limited ultrafast pulse, has hitherto been highly desirable but exacerbated by fundamental limits. One possible method to capture the phase information embedded in such short time scale, is to devise phase-preserving optical metrology mechanism for projecting it to optical field oscillating at significantly lower frequency through down-conversion process in a nonlinear medium.

SUMMARY OF THE INVENTION

An aspect of the present disclosure is related to an optical apparatus for measuring and controlling chirp of ultrafast laser pulse, including a chirp control module, a beam splitter, a nonlinear medium generation module, and a terahertz wave detection module. The chirp control module is configured to receive an ultrafast laser pulse and tune pulse duration of the ultrafast laser pulse, so as to convert the ultrafast laser pulse into a chirped pulse. The beam splitter is optically coupled with the chirp control module and configured to divide the chirped pulse from the chirp control module to a first pulse portion and a second pulse portion. The nonlinear medium generation module is optically coupled with beam splitter and configured to receive the first pulse portion and to create a nonlinear medium for generation of at least one terahertz electromagnetic wave. The terahertz wave detection module includes an electro-optic crystal, photo-diode and device for electronic signal extraction (lock-in amplifier or the equivalent) and is configured to guide the terahertz electromagnetic wave and the second pulse portion to the electro-optic crystals, photo-diode and then to the lock-in amplifier.

In some embodiments, the beam splitter divides the chirped pulse into the first pulse portion having intensity more than that of the second pulse portion.

In some embodiments, the beam splitter is further configured to reflect the first pulse portion and permit the second pulse portion to pass therethrough.

In some embodiments, the nonlinear medium generation module includes a focusing optical element (lens, off-axis parabolic mirror or equivalent), a nonlinear crystal, and a dual-wavelength waveplate. The focusing lens is optically coupled with the beam splitter. The nonlinear crystal is optically coupled with the focusing lens and configured to generate second harmonic of the incident first pulse portion. The dual-wavelength waveplate is optically coupled with the nonlinear crystal and configured to align polarization of participating waves therethrough.

In some embodiments, the focusing optics is further configured to focus waves passing therethrough to a gaseous medium having $N_2$, $O_2$, combinations thereof, or other equivalents.

In some embodiments, the first pulse portion and the second harmonic of the first pulse portion are focused to create two-color light field and generate air plasma optically coupled between the dual-wavelength waveplate and the terahertz wave detection module.

In some embodiments, the optical apparatus further includes a terahertz collection module optically coupled between the nonlinear medium generation module and the terahertz wave detection module. The terahertz collection module includes a pair of parabolic mirrors and a filter. The pair of parabolic mirrors is configured to perform beam collimation and re-focusing into the terahertz wave detection module. The filter is optically coupled between the nonlinear medium generation module and the pair of parabolic mirrors and configured to permit terahertz radiation to pass therethrough.

In some embodiments, the optical apparatus further includes a time delay stage optically coupled between the beam splitter and the terahertz wave detection module and configured to receive the second pulse portion from the beam splitter, in which the nonlinear medium generation module and the time delay stage are respectively positioned in a first optical path and a second optical path which are separated from each other.

In some embodiments, the optical apparatus further includes a beam combiner optically coupled between the nonlinear medium generation module and the terahertz wave detection module as well as between the time delay stage and the terahertz wave detection module, so as to combine at least one wave propagated from the nonlinear medium generation module with at least one wave propagated from the time delay stage.

An aspect of the present disclosure is related to a method for measuring and controlling linear chirp level of ultrafast laser pulse. The method includes steps as follows: establishing a relation of chirp to carrier-envelope phase (CEP) to have the latter as a chirp monitor, wherein the CEP-chirp relation is a projection relation between the linear chirp level of ultrafast laser pulse (target pulse) carrying a high center frequency and the CEP of the frequency-down-converted light pulse (reporter pulse) carrying a low center frequency; measuring the CEP of reporter pulse to register linear chirp level of a target pulse in accordance with the CEP-chirp relation; and controlling and stabilizing the linear chirp level of the target pulse to a desired value by adjusting a dispersion element which the target pulse passes through in accordance with the CEP-chirp relation.

In some embodiments, the establishing the CEP-chirp relation comprises varying the linear chirp level of a high-frequency laser pulse through a linear dispersion element; radiating the light pulse into a nonlinear medium where frequency-down-conversion process takes place; detecting CEP variance of the frequency-down-converted light pulse at low frequency (e.g., terahertz pulse) from the nonlinear medium; and establishing the CEP-chirp relation.

In some embodiments, measuring the linear chirp level comprises sending a target laser pulse with unknown chirp information into a nonlinear medium where frequency-down-conversion process takes place; detecting the CEP of the frequency-down-converted light pulse at low frequency (e.g., terahertz pulse) from the nonlinear medium; referencing the detected CEP with the established CEP-chirp relation; getting the chirp level of the target laser pulse.

In some embodiments, the controlling and stabilizing the linear chirp level comprises sending a target laser pulse through a linear dispersion element into a nonlinear medium where frequency-down-conversion process takes place; detecting the CEP of the frequency-down-converted light pulse at low frequency (e.g., terahertz pulse) from the nonlinear medium; referencing the detected CEP with the established CEP-chirp relation; getting the chirp level of the target laser pulse; adjusting the linear dispersion element to change the chirp level of the target laser pulse if the measured chirp level is different from desired value; repeating above actions until the measured chirp level equals to the desired value.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Aspects of the present disclosure are readily understood from the following detailed description when read with the accompanying figures. It should be noted that various features may not be drawn to scale. That is, the dimensions of the various features may be arbitrarily increased or reduced for clarity of discussion. Embodiments of the present disclosure are described in more detail hereinafter with reference to the drawings, in which.

DETAILED DESCRIPTION

Figure 1:
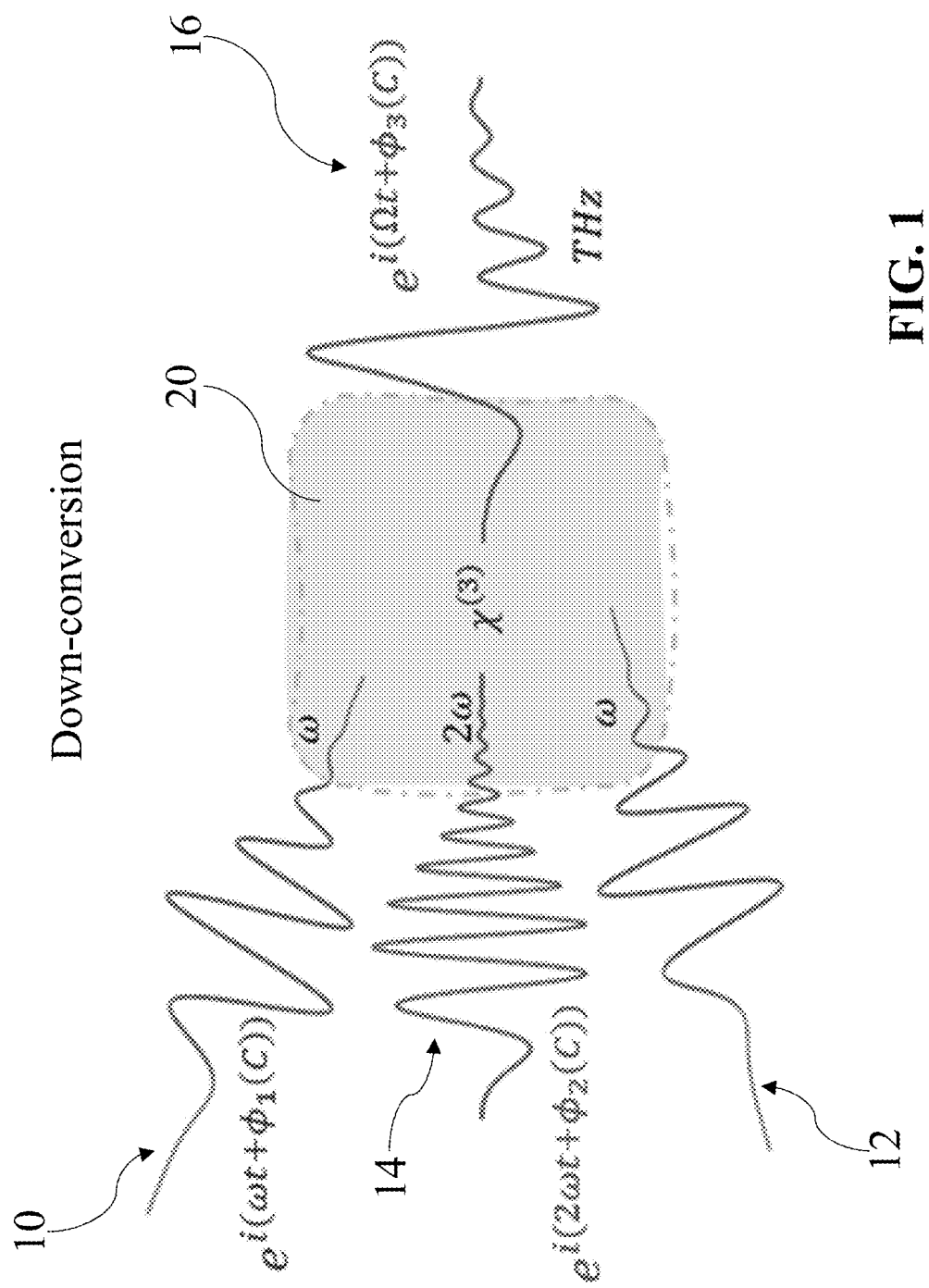
FIG. 1 illustrates mechanism of frequency down-conversion via a four-wave mixing process in a nonlinear medium.

Common reference numerals are used throughout the drawings and the detailed description to indicate the same or similar components. Embodiments of the present disclosure will be readily understood from the following detailed description taken in conjunction with the accompanying drawings.

Spatial descriptions, such as "on," "above," "below," "up," "left," "right," "down," "top," "bottom," "vertical," "horizontal," "side," "higher," "lower," "upper," "over," "under," and so forth, are specified with respect to a certain component or group of components, or a certain plane of a component or group of components, for the orientation of the component(s) as shown in the associated figure. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

Further, it is noted that the actual shapes of the various structures depicted as approximately rectangular may, in actual device, be curved, have rounded edges, have somewhat uneven thicknesses, etc. due to device fabrication conditions. The straight lines and right angles are used solely for convenience of representation of layers and features.

In the following description, an apparatus for measuring and controlling ultrafast laser pulses and the likes are set forth as preferred examples. It will be apparent to those skilled in the art that modifications, including additions and/or substitutions may be made without departing from the scope and spirit of the present disclosure. Specific details may be omitted so as not to obscure the present disclosure;

however, the disclosure is written to enable one skilled in the art to practice the teachings herein without undue experimentation.

FIG. 1 illustrates mechanism of frequency down-conversion via a four-wave mixing (FWM) process in a nonlinear medium 10. A first wave 10 and a second wave 12 having high-frequency pulse ω to be measured possess a chirp dependent phase $\phi_1(C)$. Therefore, it is possible to retrieve chirp of light pulse of the first wave 10 and the second wave 12 by measuring $\phi_1(C)$. However, such a phase is hard to resolve because of the rapid oscillation of fundamental wave at ω, which is in very high frequency, e.g., one cycle of oscillation, 2π change in phase, in just 2.6 femtosecond ($10^{-15}$ s) for 800 nm near infrared pulse. In this regard, it is rare to find an extremely precise detector or detection scheme, which can effectively respond to changes within one femtosecond.

Accordingly, to address this problem, a frequency-down-conversion process is needed. Specifically, the mixture of the frequency ω of the fundamental pulse as the first wave 10 or the second wave 12 and the frequency 2ω of its second harmonic 14 in a nonlinear medium 20 will result in a wave oscillating at low frequency, as a third wave 16, where n usually belongs to mid-infrared and far-infrared range and can be called THz wave ($0.1 \times 10^{12}$ Hz<Ω<$20 \times 10^{12}$ Hz). In some embodiments, the terahertz radiation of the present disclosure can be defined in a range from $0.1 \times 10^{12}$ Hz to $20 \times 10^{12}$ Hz. The low-frequency wave displays dependence on chirp of first and second waves in carrier-envelope phase (CEP) of the third wave $\phi_3(C)$, which is essentially originated from the phase $\phi_1(C)$ embedded in the high-frequency pulse. The CEP of low-frequency wave is then easy to measure, exhibiting one-to-one relation with the original chirp level.

Figure 2:
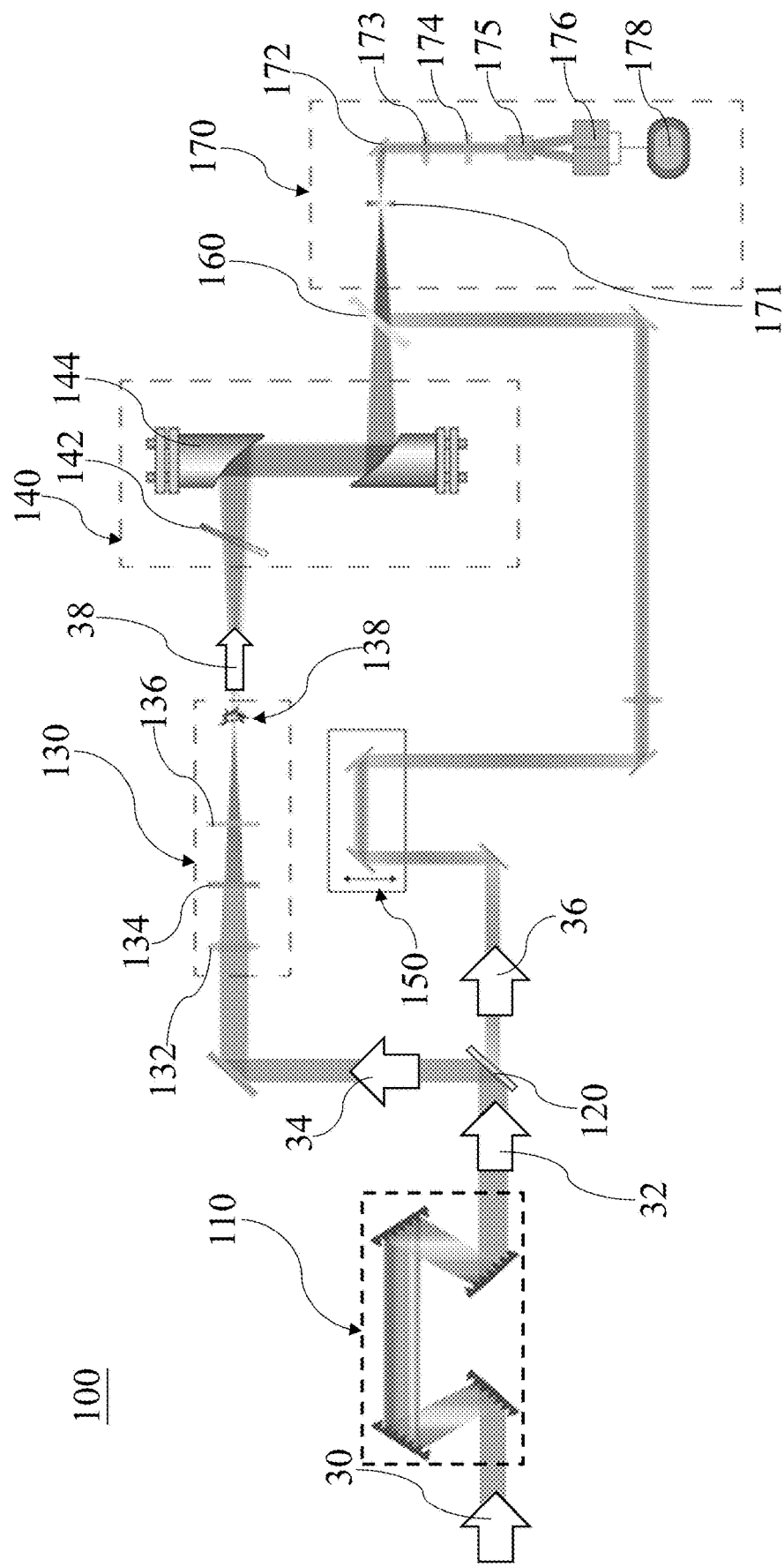
FIG. 2 illustrates a schematic layout of an optical apparatus according to some embodiments of the present disclosure.

FIG. 2 illustrates a schematic layout of an optical apparatus 100 according to some embodiments of the present disclosure. The optical apparatus 100 can serve as s a linear chirp measurement system. The optical apparatus 100 can achieve measure and control for linear chirp level of high-frequency laser pulse by monitoring carrier-envelope phase (CEP) of low-frequency terahertz emission from laser-induced air-plasma filament.

The optical apparatus 100 includes a chirp control module 110, a beam splitter 120, a nonlinear medium generation module 130, a terahertz collection module 140, a time delay stage 150, a beam combiner 160, and a terahertz wave detection module 170. Ultrafast laser pulse is guided to the optical apparatus 100 and then measurement and control to linear chirp level of high-frequency light pulse can be executed.

Ultrafast laser pulse 30 with central wavelength of 800 nm is received by the optical apparatus 100. In some embodiments, the ultrafast laser pulse 30 has optical parameters of 800 nm, 35 fs, and 1 kHz.

The ultrafast laser pulse 30 can travel in the optical apparatus 100 from the chirp control module 110. The ultrafast laser pulse 30 can passage through the chirp control module 110. The chirp control module 110 receiving the ultrafast laser pulse 30 can be configured to tune pulse duration of the ultrafast laser pulse 30. In some embodiments, the chirp control module 110 can include optical gratings, which are configured to fine tune of linear chirp C by stretching or compressing the pulse duration to a desired value. This involves dispersion compensation, which may realize a function of stretching or compressing a light pulse because the optical grating is distributed with a fixed period in along its' axis.

In this regard, linear chirp C can serve as a coefficient for a formula that frequency changes linearly with time: $\omega(t) = \omega_0 + Ct$. To stretch or compress pulse duration, the relation between the chirp C and pulse duration T' follows $T' = T_0 \sqrt{1+C^2}$, where $T_0$ is the transform-limited pulse duration. Pulse chirping refers to a phenomenon where a laser pulse changes its frequency over time, causing it to stretch or compress in the time domain. This leads to changes in its duration and shape.

After the passage in the chirp control module 110, a chirped pulse 32 is generated and travels from the chirp control module 110 to the beam splitter 120. The beam splitter 120 optically coupled with the chirp control module 110 is configured to divide the chirped pulse 32 propagated from the chirp control module 110 to a first pulse portion 34 and a second pulse portion 36.

In some embodiments, the first pulse portion 34 has intensity more than that of the second pulse portion 36. Such configuration is made for having the second pulse portion 36 become a gate pulse or a read-out pulse, which is to detect a terahertz emission in the time domain. In some embodiments, at the dividing stage to the chirped pulse 32, the beam splitter 120 can be configured to reflect the first pulse portion 34 and permit the second pulse portion 36 to pass therethrough, thereby achieving the dividing.

The first pulse portion 34 can be guided into the nonlinear medium generation module 130 which is optically coupled with beam splitter 120. In some embodiment, the guiding can be achieved by at least one reflection. In some embodiment, reflection in the path is flexible; for example, the reflection can be omitted or the number of the reflection can get increased or decreased. The nonlinear medium generation module 130 is configured to receive the first pulse portion 34. The nonlinear medium generation module 130 is configured to create a nonlinear medium for generation of at least one terahertz electromagnetic wave.

Specifically, in the illustrated configuration, the nonlinear medium generation module 130 includes a focusing lens 132, a nonlinear crystal 134, and a dual-wavelength waveplate 136.

The focusing lens 132 is optically coupled with the beam splitter 120 so that it can receive the first pulse portion 34 propagated from the beam splitter 120. The nonlinear crystal 134 is optically coupled with the focusing lens 132 so the first pulse portion 34 can pass through the nonlinear crystal 134. The nonlinear crystal 134 is configured to generate second harmonic of an incident pulse. For example, the nonlinear crystal 134 can generate second harmonic of the incident first pulse portion 34. In some embodiments, the nonlinear crystal 134 includes β-barium borate (β-BBO) which can be applied to generation of second harmonic of an incident fundamental pulse. In some embodiments, the β-BBO can contribute to the generation of second harmonic with an efficiency of 16%.

As such, the combined two-color field of the first pulse portion 34 and its second harmonic is focused to generate two-color air plasma. More specifically, the focusing lens 132 can be configured to focus waves passing therethrough to a gaseous medium having $N_2$, $O_2$, combinations thereof, or other equivalents. Accordingly, around the focus of the focusing lens 132, the intensity of the combined field can suffice for ionizing gas molecules, such as $N_2$ and $O_2$, in the ambient air to form a plasma filament 138. In some embodiment, the plasma filament 138 is with size of several millimeters in longitudinal direction. In some embodiment, the plasma filament 138 can be called a laser-induced air-plasma filament. The plasma in air functions as a nonlinear medium. In some embodiment, the laser-induced air plasma is utilized as the nonlinear medium to realized precise measurement and control of chirp level of high-frequency light pulse. In some embodiments, any other nonlinear medium ensuring frequency down-conversion process can also be applied.

The first pulse portion 34 and its second harmonic then can pass through the dual-wavelength waveplate 136 which is optically coupled with the nonlinear crystal 134. The dual-wavelength waveplate 136 is configured to align polarization of participating waves therethrough. For example, the dual-wavelength waveplate 136 can align polarization of the first pulse portion 34 with its second harmonic for maximal terahertz generation efficiency. The plasma filament 138 can serve as medium for nonlinear interaction of an intense driving laser field to promote frequency-down-conversion enabled by four-wave mixing process. As a result, it generates a broadband terahertz electromagnetic wave, of which the corresponding frequency is approximately a hundred times lower than that of the incident laser pulse with well-defined chirp. The generated broadband terahertz electromagnetic wave is labeled as a terahertz pulse 38.

The terahertz pulse 38 then travels toward and enters the terahertz collection module 140. The terahertz collection module 140 is optically coupled with the nonlinear medium generation module 130 and between the nonlinear medium generation module 130 and the terahertz wave detection module 170. The terahertz collection module 140 includes a filter 142 and a pair of parabolic mirrors 144, in which the filter 142 is optically coupled between the nonlinear medium generation module 130 and the pair of parabolic mirrors 144.

The filter 142 is configured to permit terahertz radiation to pass therethrough such that the terahertz pulse 38 can pass through the filter 142 with copropagating electromagnetic waves outside terahertz range being removed. In some embodiments, the filter 142 includes a silicon wafer or a silicon-based film for serving as a bandpass filter. The terahertz pulse 38 propagated from the filter 142 can get into the parabolic mirrors 144, and the parabolic mirrors 144 can perform beam collimation with respect to the terahertz pulse 38. The beam collimation includes collimating for the terahertz pulse 38 by one of the parabolic mirrors 144 and refocusing for the terahertz pulse 38 by another one of the parabolic mirrors 144.

The terahertz pulse 38 then can be guided to the beam combiner 160. In this regard, a first optical path can be established, which is from the beam splitter 120 to the beam combiner 160 through the nonlinear medium generation module 130 and the terahertz collection module 140 in sequence.

As for the second pulse portion 36, the second pulse portion 36 can be guided into the time delay stage 150 which is optically coupled with the beam splitter 120 and between the beam splitter 120 and the terahertz wave detection module 170. The time delay stage 150 can receive the second pulse portion 36. The time delay stage 150 can be used to introduce a controlled delay in the second pulse portion 36, such as creating a longer path length for second pulse portion 36. The time delay can be adjusted by changing the physical length of the time delay stage 150 or by adjusting the refractive index of the material used in the time delay stage 150. By the adjusting of the time delay stage 150, the second pulse portion 36 can serve as gate pulse or read-out pulse, to detect the terahertz pulse 38 from the plasma of the nonlinear medium generation module 130.

The second pulse portion 36 then can be guided to the beam combiner 160. In this regard, a second optical path can be established, which is from the beam splitter 120 to the beam combiner 160 through the time delay stage 150. That is, the nonlinear medium generation module 130 and the time delay stage 150 are respectively positioned in the first optical path and the second optical path which are separated from each other. In some embodiments, the second optical path includes reflection or collimation with respect to the second pulse portion 36, which can be achieved by at least one reflector or at least one lens.

The beam combiner 160 is optically coupled between the nonlinear medium generation module 130 and the terahertz wave detection module 170 as well as between the time delay stage 150 and the terahertz wave detection module 170, so as to combine at least one wave propagated from the nonlinear medium generation module 130 with at least one wave propagated from the time delay stage 150. More specifically, the terahertz pulse 38 is in combination with the second pulse portion 36 by the beam combiner 160, in which the beam combiner 160 can allow the terahertz pulse 38 to pass therethrough and reflect the second pulse portion 36. In some embodiments, the beam combiner 160 includes a pellicle or indium tin oxide (ITO) thin film, which may be a transparent thin film to combine light beams without causing interference.

The terahertz pulse 38 in combination with the second pulse portion 36 enters the terahertz wave detection module 170. In some embodiments, the terahertz wave detection module 170 includes an electro-optic crystal 171, a reflector 172, a lens 173, a quarter wave plate 174, a Wollaston prism 175, and a photo-diode 176. Briefly, the terahertz wave detection module 170 is configured to guide the terahertz pulse 38 in combination with the second pulse portion 36 to the electro-optic crystals 171 and eventually to the data acquisition unit 178, e.g., lock-in amplifier or signal digitizer for the detection, in which the second pulse portion 36 can read out transient electric field of the terahertz pulse 38 by electro-optic sampling.

More specifically, the second pulse portion 36 of femtosecond duration can experience a polarization change due to birefringence induced by the overlapping quasi-static electric field of the picosecond terahertz pulse 38 inside the electro-optic crystal 171. In some embodiments, the electro-optic crystal 171 include GaP, GaSe, ZnTe, combinations thereof, or equivalencies. The polarization change at a fixed gate-THz delay between the second pulse portion 36 and the terahertz pulse 38 can be detected by a mechanism built by the quarter wave plate 174, the Wollaston prism 175 or polarizing beam splitter, and the photo-diode 176, in which the reflector 172 and the lens 173 can be configured to guide the waves during the propagation thereof. As such, by sweeping the time delay between the second pulse portion 36 and the terahertz pulse 38 continuously, the time-domain signal of the terahertz pulse 38 can be fully characterized for spectroscopic analysis.

Such the manner can achieve a mechanism for high precision measurement of chirp of ultrafast laser pulse, based on the FWM process, so as to facilitate the process of frequency down-conversion from near-IR and visible to far-infrared terahertz range. The manner is especially suitable for near-transform-limited laser pulse, providing sensitivity to sub-cycle phase information of the incident pulse, equivalent to a time scale of sub-65 attosecond ($<65*10^{-18}$ s) for incident pulse with center wavelength of 800 nm. For target laser pulse with large chirp level, i.e., far away from transform-limited condition, an initial chirp level offset adjustment, e.g., reducing the chirp level of the target laser pulse, can be made through the chirp control module 110, to let the target laser pulse fulfill the near-transform-limited condition. The chirp level offset can be later added onto the measured chirp level from the optical apparatus 100 to work out the real chirp level.

The manner, which is called a method for measuring and controlling chirp of ultrafast laser pulse, includes a first step of establishing a projection relation called CEP-chirp relation between the chirp level of ultrafast laser pulse at high frequency and the CEP of the frequency-down-converted light pulse at low frequency, and a second step of measuring and controlling the ultrafast laser pulse of unknown linear chirp level.

The establishing the CEP-chirp relation can include: varying the linear chirp level of a high-frequency laser pulse through a dispersion element; radiating the light pulse into a nonlinear medium where frequency down-conversion process takes place; detecting CEP variance of the frequency-down-converted light pulse at low frequency (e.g., terahertz pulse) radiated from the nonlinear medium; and establishing the CEP-chirp relation. In some embodiments, the establishing the CEP-chirp relation is performed after detecting the CEP variance.

For the stage of varying the linear chirp level, it can be achieved by the chirp control module 110. For the stage of and radiating the light pulse into the nonlinear medium for the frequency down-conversion process, it can be achieved by the nonlinear medium generation module 130. For the stages of detecting CEP variance of the frequency-down-converted light pulse and establishing the CEP-chirp relation, it can be achieved by the terahertz wave detection module 170. In some embodiments, the terahertz wave detection module 170 may further include a controller electrically coupled with the data acquisition unit 178 and configured to establish the CEP-chirp relation at least based on the terahertz pulse 38.

The measuring and controlling the linear chirp level of an unknown laser pulse can include: determining the CEP of the frequency-down-converted light pulse generated from the nonlinear medium; and retrieving the linear chirp level of the unknown laser pulse by referencing to the established CEP-chirp relation in advance.

For the stages of determining the CEP of the frequency-down-converted light pulse and retrieving the linear chirp level, it can be achieved by the terahertz wave detection module 170, as afore-described as sweeping the time delay between gate and terahertz pulse continuously.

Thereafter, in response to the CEP-chirp relation which can serve as a chirp monitor, measuring and feedbacking the dispersion element (e.g., the chirp control module 110) to control and stabilize the chirp of pulse can be performed. Specifically, to realize the function of chirp measurement, a target laser pulse with unknown chirp information will be sent into the apparatus. The CEP of the target laser pulse can be detected by the terahertz wave detection module 170. By referencing the detected CEP with the established CEP-chirp relation, the chirp level of the target laser pulse can be directly read out.

In order to realize the function of controlling and stabilizing the chirp level of the target laser pulse, a feedback loop can be set onto the dispersion element. Specifically, as stated before, the chirp level of a target laser pulse can be measured by referencing the detected CEP with the established CEP-chirp relation. When the measured chirp level is different from desired value, an adjustment will be made in the dispersion element by the feedback loop to change the chirp level of the target laser pulse until the measured chirp level equals to the desired value.

Figure 3:
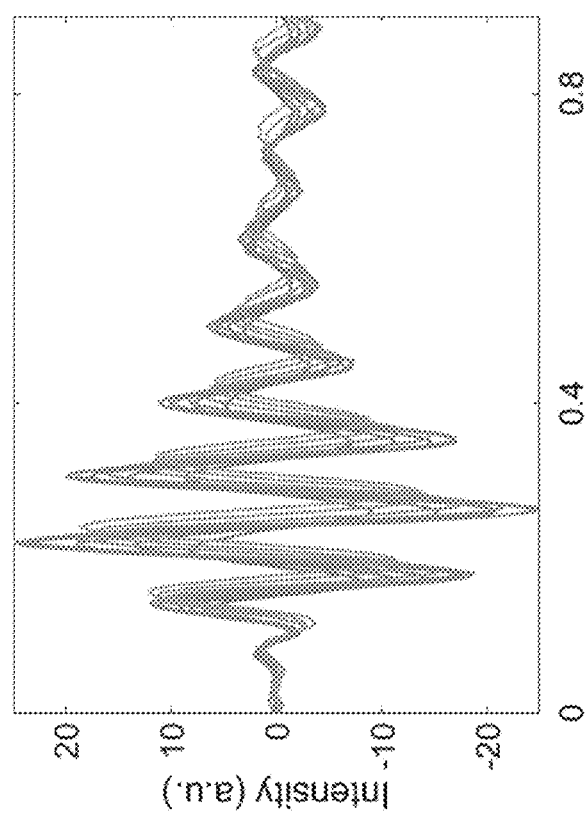
FIG. 3 is a graph of individual time-domain waveforms of the outgoing THz radiation according to some embodiments of the present disclosure.
Figure 4:
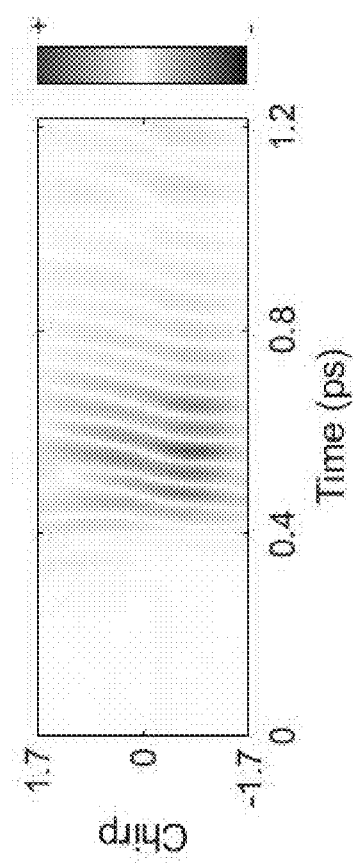
FIG. 4 is individual time domain signals in FIG. 3.

FIG. 3 is a graph of individual time-domain waveforms of the outgoing THz radiation according to some embodiments of the present disclosure, and FIG. 4 is individual time domain signals in FIG. 3. In FIG. 4, the time-domain signal detected by electro-optic sampling crystal displays a strong dependence of its carrier envelop phase on the chirp (y-axis) of incident femtosecond driving pulse. The unique feature of the tilting stripes indicates the carrier envelope phase shift in time domain as the chirp of incident driving field varies. This can be seen more clearly by looking at FIG. 3, showing several representative time-domain signals cut from FIG. 4 under different chirp. Tracing the varying location of a specific electric field peak, one can directly perceive the continuous change in chirp-dependent phase of oscillating THz field.

Figure 5:
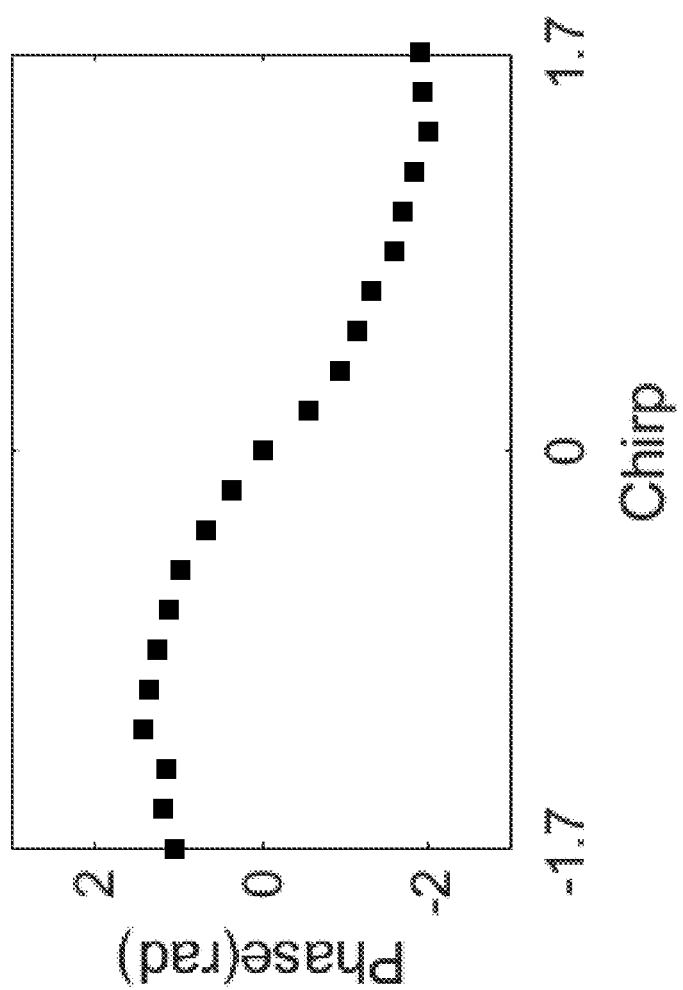
FIG. 5 illustrates carrier-envelope phase (CEP) of a detected terahertz signal at 10 THz as a function of the chirp.

FIG. 5 illustrates CEP of a detected terahertz signal at 10 THz as a function of the chirp of the input laser pulse. The spectrum of the THz emission approximately centers at frequency of 10 THz with its chirp-dependent phase shown in FIG. 5. One can readily notice that the phase of THz emission scales monotonically with the chirping parameter. The phase tuning curve shows the rapidest change near C=0, therefore the highest sensitivity to change in chirp of femtosecond optical pulse in a range, where other methods oppositely provide vanishingly small sensitivity. This is realized by self-referencing non-linear interaction in target pulse induced plasma filament and subsequently adopting a phase-sensitive measurement on resultant low-frequency THz emission from optimal accuracy. In case of an incident pulse with unknown chirp parameter, the chirp parameter can be retrieved by resolving the CEP of the generated terahertz pulse and referring to a pre-calibrated quasi-linear CEO-chirp relation curve as in FIG. 5.

The method for measuring and controlling the chirp of ultrafast light pulses according to the present invention may be operated but not limited as described above. Various modifications and variations can be made without departing from the scope and spirit of the present invention, such as replacing with other nonlinear medium other than air plasma and so on.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. An optical apparatus for measuring and controlling chirp of an ultrafast laser pulse, comprising:
a chirp control module configured to receive an ultrafast laser pulse and tune a pulse duration of the ultrafast laser pulse, so as to convert the ultrafast laser pulse into a chirped pulse;
a beam splitter optically coupled with the chirp control module and configured to divide the chirped pulse from the chirp control module to a first pulse portion and a second pulse portion;
a nonlinear medium generation module optically coupled with the beam splitter and configured to receive the first pulse for generation of at least one terahertz electromagnetic wave using a nonlinear medium, wherein the nonlinear medium serves as a medium for nonlinear interaction of an intense driving laser field to promote frequency-down-conversion enabled by four-wave mixing process;
a terahertz wave detection module comprising an electro-optic crystal, photo-diode and a lock-in amplifier and configured to guide the terahertz electromagnetic wave and the second pulse portion to the electro-optic crystal, photo-diode and then to the lock-in amplifier;
a terahertz collection module optically coupled between the nonlinear medium generation module and the terahertz wave detection module and comprising:
a pair of parabolic mirrors configured to perform beam collimation and refocusing; and
a filter optically coupled between the nonlinear medium generation module and the pair of parabolic mirrors and configured to permit terahertz radiation to pass therethrough;
a time delay stage optically coupled between the beam splitter and the terahertz wave detection module and configured to receive the second pulse portion from the beam splitter, wherein the nonlinear medium generation module and the time delay stage are respectively positioned in a first optical path and a second optical path which are separated from each other; and
a beam combiner optically coupled both between the terahertz collection module and the terahertz wave detection module and between the time delay stage and the terahertz wave detection module, so as to combine the terahertz electromagnetic wave which is from the nonlinear medium generation module and guided by the terahertz collection module with the second pulse portion propagated from the time delay stage.

2. The optical apparatus according to claim 1, wherein the beam splitter divides the chirped pulse into the first pulse portion having an intensity more than that of the second pulse portion.

3. The optical apparatus according to claim 2, wherein the beam splitter is further configured to reflect the first pulse portion and permit the second pulse portion to pass therethrough.

4. The optical apparatus according to claim 1, wherein the nonlinear medium generation module comprises:
a focusing lens optically coupled with the beam splitter;
a nonlinear crystal optically coupled with the focusing lens and configured to generate a second harmonic of the first pulse portion; and
a dual-wavelength waveplate optically coupled with the nonlinear crystal and configured to align polarization of participating waves therethrough.

5. The optical apparatus according to claim 4, wherein the focusing lens is further configured to focus waves passing therethrough to a gaseous medium having $N_2$, $O_2$, or combinations thereof.

6. The optical apparatus according to claim 4, wherein the first pulse portion and the second harmonic of the first pulse portion are focused to generate two-color air-plasma optically coupled between the dual-wavelength waveplate and the terahertz wave detection module.

7. A method for measuring and controlling a linear chirp level of an ultrafast laser pulse, comprising:
receiving an ultrafast laser pulse by a chirp control module;
tuning a pulse duration of the ultrafast laser pulse by the chirp control module, so as to convert the ultrafast laser pulse into a chirped pulse;
using a beam splitter optically coupled with the chirp control module to divide the chirped pulse from the chirp control module to a first pulse portion and a second pulse portion;
receiving the first pulse portion by a nonlinear medium generation module for generating at least one terahertz electromagnetic wave using a nonlinear medium, wherein the nonlinear medium serves as a medium for nonlinear interaction of an intense driving laser field to promote frequency-down-conversion enabled by four-wave mixing process;
radiating the first pulse portion into the nonlinear medium where a frequency-down-conversion process takes place;
using a filter of a terahertz collection module to permit terahertz radiation of the terahertz electromagnetic wave generated from the first pulse portion to pass therethrough the filter and thus permit the terahertz electromagnetic wave to enter a pair of parabolic mirrors of the terahertz collection module;
performing beam collimation and refocusing for the terahertz electromagnetic wave using the pair of the parabolic mirrors;
guiding the second pulse portion from the beam splitter into a time delay stage such that the second pulse portion serves as a gate pulse or a read-out pulse, wherein the nonlinear medium generation module and the time delay stage are respectively positioned in a first optical path and a second optical path which are separated from each other;
combining the terahertz electromagnetic wave which is from the nonlinear medium generation module and guided by the terahertz collection module with the second pulse portion propagated from the time delay stage by using a beam combiner;
receiving the terahertz electromagnetic wave and the second pulse portion which are propagated from the beam combiner by a terahertz wave detection module;
establishing, by the terahertz wave detection module, a carrier-envelope phase-chirp (CEP-chirp) relation which serves as a chirp monitor, wherein the CEP-chirp relation is a projection relation between a linear chirp level of the ultrafast laser pulse at a high frequency and a CEP of a slower frequency-down-converted light pulse;
measuring the linear chirp level of a target pulse in accordance with the CEP-chirp relation; and controlling and stabilizing the linear chirp level of the target pulse to a desired value by varying a dispersion element which the target pulse passes through in accordance with the CEP-chirp relation.

8. The method according to claim 7, wherein the establishing the CEP-chirp relation comprises varying the linear chirp level of the high frequency ultrafast laser pulse through the dispersion element.

9. The method according to claim 8, wherein the combining the terahertz electromagnetic wave with the second pulse portion using the beam combiner is to guide the terahertz electromagnetic wave and the second pulse
into the terahertz wave detection module for detecting the CEP of the frequency-down-converted light pulse under each linear chirp level and then establishing the CEP-chirp relation.

10. The method according to claim 7, wherein measuring the linear chirp level comprises:
sending a target laser pulse with unknown chirp information into the nonlinear medium where the frequency-down-conversion process takes place;
detecting the CEP of the frequency-down-converted light pulse at a low frequency from the nonlinear medium;
referencing the detected CEP with the established CEP-chirp relation; and
obtaining the linear chirp level of the target laser pulse.

11. The method according to claim 10, wherein the light pulse at the low frequency comprises a terahertz pulse.

12. The method according to claim 7, wherein controlling and stabilizing the linear chirp level comprises:
a fine-tuning stage comprising:
sending a target laser pulse through a second dispersion element into the nonlinear medium where the frequency-down-conversion process takes place;
detecting the CEP of the frequency-down-converted light pulse at a low frequency from the nonlinear medium;
referencing the detected CEP with the established CEP-chirp relation;
obtaining the linear chirp level of the target laser pulse; and
adjusting the second linear dispersion element to change the linear chirp level of the target laser pulse and to obtain an updated linear chirp level of the target laser pulse, if the measured linear chirp level is different from a desired value; and
repeating the fine-tuning stage until the updated linear chirp level equals to the desired value.

\* \* \* \* \*